United States Patent Office.

BENEDICT LEHMANN, OF PIQUA, OHIO.

Letters Patent No. 62,759, dated March 12, 1867.

IMPROVED OINTMENT FOR CURING SPAVIN, SPLINT, &c., IN HORSES.

The Schedule referred to in these Letters Patent and making part of the same.

TO ALL WHOM IT MAY CONCERN:

Be it known that I, BENEDICT LEHMANN, of Piqua, in the county of Miami, and State of Ohio, have invented a new and improved Medicine; and I do declare that the following is a full and exact description thereof.

The nature of my invention consists in combining certain ingredients for the purpose of curing spavin, splint, ring-bone, curb, windgalls, and all similar blemishes.

To enable others skilled in the art to make and use my invention, I will proceed to describe its manufacture.

I take of deutoiodide of mercury two drams, of lard two ounces, of lampblack one-half a dram. Mix and make into ointment. To be used by external application.

What I claim as my invention, and desire to secure by Letters Patent, is—

The combination of the above-named ingredients so as to produce an ointment for the purpose of curing the blemishes above mentioned.

<div style="text-align:right">BENEDICT LEHMANN.</div>

Witnesses:
    FRIEDERICH JOSSE,
    J. F. McKINNEY.